May 28, 1940.    H. R. OWEN    2,202,396
SHATTERPROOF ARTICLE OF GLASS
Filed July 1, 1938    2 Sheets-Sheet 1
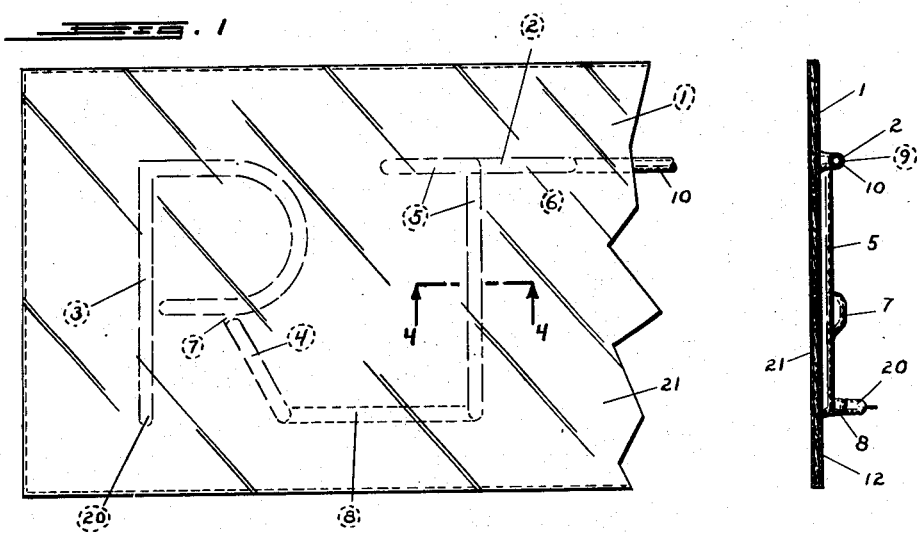
Fig. 1
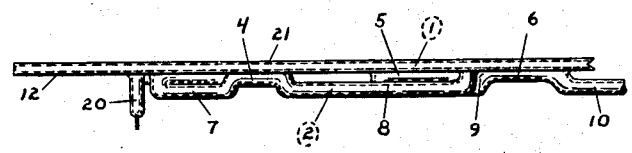
Fig. 2
Fig. 3
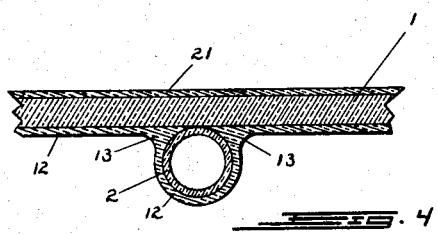
Fig. 4
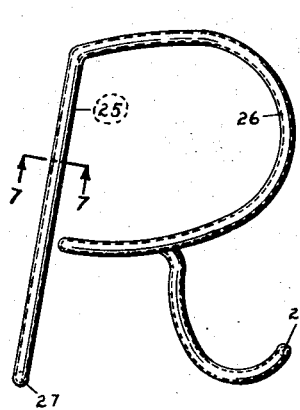
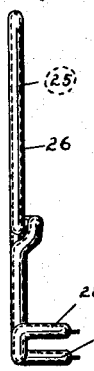
Fig. 5
Fig. 6
Fig. 7    Fig. 8
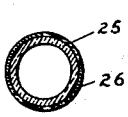
INVENTOR

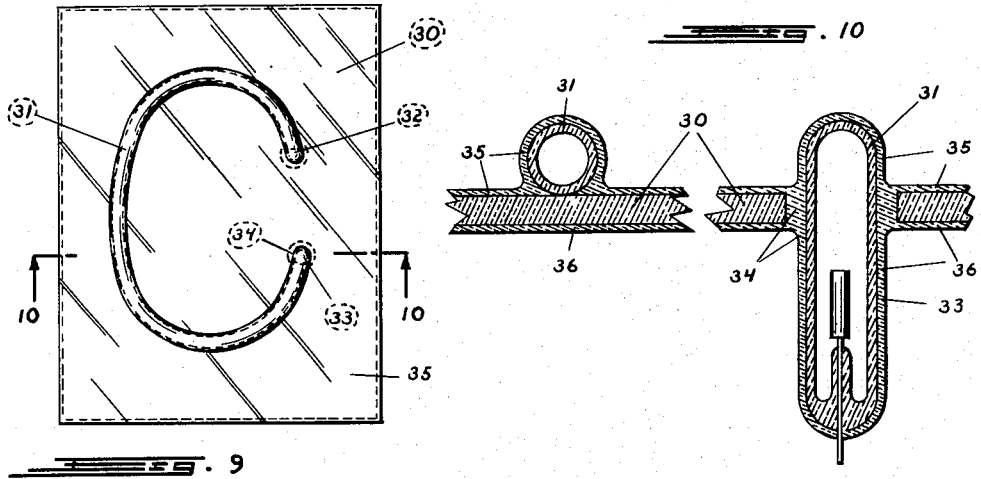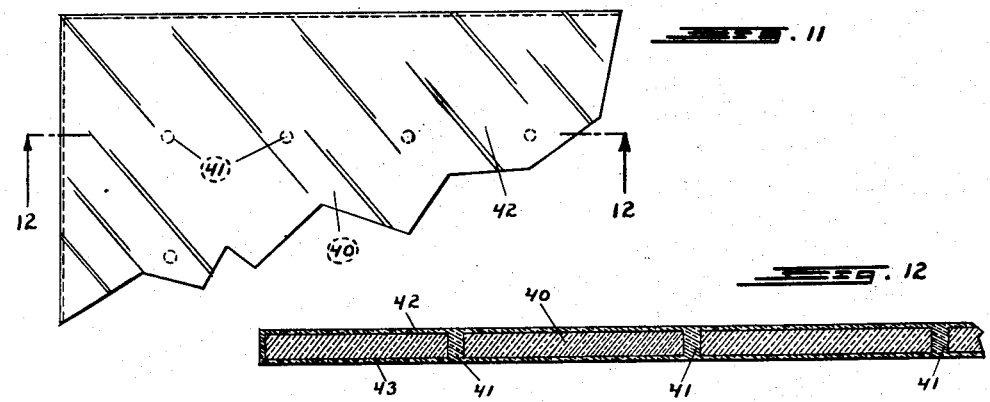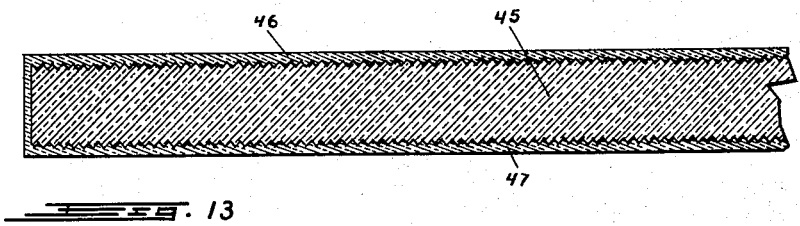

Patented May 28, 1940

2,202,396

UNITED STATES PATENT OFFICE 2,202,396

SHATTERPROOF ARTICLE OF GLASS

Harold Ray Owen, Los Angeles, Calif., assignor to Electrical Products Corporation, Los Angeles, Calif., a corporation of California Application July 1, 1938, Serial No. 217,109

1 Claim. (Cl. 40—130)

This invention relates to shatterproof articles of glass and is directed to the production of various types of articles of commerce with sheathings and coatings of plastic material to prevent fragmentation. In the preferred forms of the invention the strength of the glass is very substantially increased by the application of compression thereto brought about by a final setting in shrinkage of the encasing material. It is observed that this increase in strength is far beyond anything to be expected from the characteristics of the materials or the ordinary results of their combination. Under test the performance of articles made here according is highly suggestive of the behavior of tempered glass. It is believed that the same phenomenon is involved in both cases.

As compared with the tempering of glass, my invention suffers few of the limitations which have prevented the widespread use of tempered glass articles in commerce. It is entirely practicable to apply my sheathings to a great variety of shapes. While the best results are to be expected with articles which approximate solids of revolution around which the sheathings may contact uniformly, it is possible to apply it even to sheets by observing certain provisions described below to insure bonding between the coverage and the article. As is to be expected with any new technique, articles made here according will follow certain trends in design to meet the peculiarities of the medium. It can be foreseen, allowing for such development, that this invention may be applied with but few serious limitations to the entire range of glass articles of commerce and at but a fraction of the cost of glass tempering.

By way of illustration, but not by way of limitation, I have shown the invention as applied to illuminating devices such as glass sheets and electric sign units, it being among the objects of the invention to provide protective coatings for sheets of glass and like material and for glass sheeting combined with preformed luminous tubes. In this connection the invention provides for a new and novel construction of an electric sign in which a luminous tube is combined with a glass sheet, positioned to the rear thereof and sealed to it by a plastic coating which forms meniscuses along each side of the tube to improve the light transmission through the sheet. Portions of the tubing non-descriptive of the display may be backset from the glass and obliterated from the display very effectively by suitable finishing of the glass surfaces. Pigmentation or other coloration may be combined with the plastic or applied as a surface finish to produce very attractive effects.

As applied to sheetlike articles it is an object of the invention to provide for firm bonding of the plastic with the surfaces of the sheets without detracting from the transparency of the product. This is accomplished by providing rough or figured surfaces on the sheet and applying the plastic so that it sets with a smooth surface. With the index of refraction of the plastic at all comparable to that of the glass the surface roughness of the glass virtually disappears to the view under this treatment. It is also among the objects hereof to provide for tight bonding for other purposes and by other methods as hereafter set forth.

As applied to elongated articles it is an object of the invention to provide adhesion to resist slippage lengthwise by taking advantage of contraction in the plane of the small section. Very good results may thus be secured with plastics which have little normal bonding with glass. The invention in certain of its novel features may be practiced by the use of plastic coatings which function to hold the elements together in the combinations described and provide mechanical protection quite apart or additionally to the feature of compression, and hence in such instances plastics which are not contractive to the extent of producing the increased strength in the glass may be used.

It is a further object of the invention, in its application to gaseous conduction tubing, such as used for illuminating purposes, to reduce the probability of failure of tubing due to incipient cracks and true cracks in the tubing as well as to provide mechanical protection and impart shatterproof qualities to the tubing. Faults in the tube which might develop into cracks are prevented from developing by the compression applied to the walls. Glass is stronger in compression than in tension and before a fault can open into a crack this initial compression must be relieved, a condition which will be rarely met with my device. In the case of true cracks which for any reason extend completely through the tube wall, failure cannot occur if gas leakage is prevented. In my devices the severed glass is held tightly together and an infinitesimal exposure exists to the inside of the sheathing. The gas given off by the sheathing is so little that it is readily absorbed by the normal self-purifying action of the tube. No gas can get in from the atmosphere through the coating.

Further objects of the invention will be apparent from the drawings and the following specification. It is to be understood that the invention is not limited to the particular embodiments which I have chosen by way of illustration, but may be variously embodied in articles of commerce and modified within the scope of the broadest language of the appended claim.

The invention is shown in illustrative embodiments thereof in the accompanying drawings in which the same reference numeral appearing in more than one view is to be understood as referring to the same or the equivalent part throughout.

Figure 1 is a front elevation of a section of an electric sign structure having a preformed gaseous conduction lighting tube fabricated with a glass plate into a single unit by an embrasive plastic coating. Figure 2 is a bottom view of the same. Figure 3 is a side elevation of the sign section as shown. Figure 4 is a cross section through the glass plate and a letter stroke of the tube taken as indicated by the section line 4—4 in Figure 1, and enlarged.

Figure 5 is a front view of a sign letter formed by a gaseous conduction lighting tube coated with plastic material here according. Figure 6 is a side elevation of the same. Figures 7 and 8 are cross sections taken as indicated by the section line 7—7 in Figure 5 illustrative of two different depths of coating, and enlarged.

Figure 9 is a front view of an individual sign character formed by a glass plate and a gaseous conduction lighting tube letter positioned on the front of the plate and coated therewith with plastic. Figure 10 is a fragmentary cross section thereof taken as indicated by the section line 10—10 in Figure 9, and shown enlarged.

Figure 11 is a front view of a section of a glass plate coated with plastic and having openings through the plate at intervals to increase the bond between plastic and glass. Figure 12 is a cross section through the same taken as indicated by the section line 12—12 in Figure 11, and shown approximately full sized.

Figure 13 is a cross section through a glass plate having irregular surfaces and plastic coatings covering the same, shown in exaggerated scale.

In Figures 1 to 4, numeral 1 indicates a glass plate to the rear of which is positioned the gaseous conduction tube 2 descriptive of a sign. Preferably, those portions of the tube which are in direct representation of features of the sign, as indicated by numerals 3, 4, 5 and 6, are formed to lie in a common plane and against the glass. Those portions non-descriptive of the sign, as indicated by 7, 8, 9 and 10, are backset from the glass in order that they may be concealed by pigmentation in the plastic at corresponding places on the glass, by an aftercoat of paint, or otherwise.

A coating of plastic material, indicated by 12, is applied over the rear surface of the glass and the descriptive portions of the tube. The most suitable method of application is by means of the spray gun, although various other methods may be used if desired. From the standpoint of illuminating results, the formation of decided meniscuses on each side of the tube as indicated by 13 in Figure 4, is desirable, whereby a passage is provided through solid material to the front of the sign for all of the light of the tube. The tube is thus included as a single optical unit with the plate and a more effective application of light rays achieved by avoiding refraction in the forward passage. The plastic material around the tube should be light transmissive. At other places on the back of the sign it may carry pigment for background effects.

The coating may be carried around over the non-descriptive portions of the tubing, as shown in the drawings, for further mechanical protection. The light of those portions of the tubing should be obliterated to the front by pigmentation or other suitable means on the tube portions or on either surface of the glass plate. The electrode terminals, such as the one indicated at 20, may be finished in any desired fashion depending on the electrical details of the installation. Preferably, they are turned backward as shown and coated completely with plastic. If desired the electrode of this view and the other views may be left clear of plastic for a distance from the end.

The sign may be completed by carrying the plastic coating over the front surface as indicated by 21 and around all the edges of the glass plate. In the preferred embodiments of the invention the plastic coating is under tension and the glass elements under a consequent compression. This condition may be brought about with certain plastic materials by allowing the material to shrink naturally as it dries or sets in place. With other materials, chemical or heat treatment may be required to bring about a final setting in this condition. A tight bond between the coating and the glass is much to be desired. While in some instances the normal adhesion of the coating for the glass is sufficient, in others special treatment of the glass surface may be necessary as illustrated by further views herein and explained below. A plastic material known commercially as Nycon and manufactured by American Plastics Corp., of Richmond, Calif., is suitable for this purpose.

The matter of surface adhesion is not so critical with circular or cylindrical objects in which the shrink in planes through the smaller section provides surface friction as against coating slippage in the longer dimensions. Thus in the gaseous conduction tube character of Figures 5 to 8, which may be taken as illustrative of cylindrical objects, the shrink of the coating around the tube provides, in most instances, adequate resistance to longitudinal slippage.

The tube in these views is indicated by 25 and the coating by 26. The tube terminates in the usual electrode terminals 27 and 28 which may be completed in any of several suitable fashions. Figures 7 and 8 are illustrative of deep and shallow coatings respectively, indicative of the fact that the depth of coating is not fixed but is a variable dependent on several physical factors.

With devices of the character of that of Figure 5 the coating compresses the glass uniformly around the section. In applying tension coatings to devices of the general nature of that of Figure 1 or Figure 9, careful consideration is to be given to the matter of balancing the stress on the two sides of the plate. Ordinarily the application of coating to the same depth is sufficient to insure uniform compression across the section of the glass plate. The introduction of the tube outside the main section of the assembly introduces a theoretical complication because of the shifting of the center of gravity of the assembly to the side of the plate on which the tube is positioned and the unbalancing of the stress in the glass as between the two sides of the plate. In consideration of the fact that the displacement in compression of glass is very slight, it will be appreciated that this complication is of negligible moment except in instances where extreme dimensions are involved. In such cases, variations in coating thickness will usually provide all the latitude necessary to meet requirements thus introduced.

In Figure 9 I have shown a sign unit consisting of the glass plate 30 having a gaseous conduction tube character 31 positioned in front and in contact with the front surface. The electrode terminals 32 and 33 extend backward through suitable openings through the plate, as indicated by 34 in Figure 10. The plastic coating 35 over the front surface of the plate and the tube is integral with the coating 36 on the back, being continuous therewith around all the edges of the plate and through the electrode passages through the plate.

In the construction of articles having extended surfaces such as glass plates the problem of bond between the coating and the surface of the plate becomes of major importance. One method of improving the bond is shown in Figures 11 and 12. The glass plate 40 has a number of holes formed through it to provide ties 41, 41, etc., from side to side to prevent slippage of the coatings 42 and 43.

In the construction illustrated by the cross section of Figure 13 a glass plate 45 is used having a rough or figured surface. Various commercial surface finishes may be used in this connection. The surface treatment known commercially as "Prism Glass" is suitable, as is also for certain purposes, sand blasting. The term "rough surface" as used in the claim is to be understood as embracing all such finishes which are other than smooth. The coatings 46 and 47 in this instance are applied to dry smooth. The result of this treatment is that the structure will appear practically clear if transparent plastic is used. Thus, the advantage of a roughened surface for bond is secured without reducing the transparency of the plate.

As applied to the construction of gaseous conduction tubing the invention serves to greatly reduce the probability of failure of the tubing. Failure of such tubing due to defects in workmanship and faults in the raw material occur at all stages of manufacture and often after final installation. They are due largely to tube breakage and to gas leaks in tubes through minute cracks. The raw tube stock often contains impurities and air pockets which later on result in incipient breaks in the tubing. During manipulation in the glass room the tubing is often left too thin in spots or is improperly annealed. Thus commercial tubing is subject to a certain percentage of incipient cracks.

The sheathing of my invention not only provides insurance against breakage by external factors but it serves to prevent these incipient cracks from developing into true cracks through the tube walls. In case true cracks have developed the sheathing serves to hold the severed parts tightly together and seal the crack from the atmosphere to prevent gas leakage. Tubes in this condition may continue in service for a long time.

The significance of tension in the cracking of glass may be illustrated by the spread of cracks in plate glass windows. Very large windows are commonly exposed at street level to the press of traffic. People lean against them without danger and one may actually spring a window in and feel the give of the glass without breaking it. But once a crack has started it spreads across the glass to the edge with the application of very little pressure on the face of the window. This is true with even small windows. To prevent the spread of a crack the glass worker makes a small fracture across the glass just ahead of the running crack. This serves to distribute the tension on the convex side of the glass as it is sprung and the crack stops at the fracture.

Glass workers in severing glass tubing very often may be observed to apply a pull on the glass as they break it. This may also be noticed in the severing of glass sheets. Highly suggestive of the new principles herein developed is the behavior of reenforced concrete. It is known that cracking of the concrete in a beam is of little moment as long as the cracking takes place on the compression side and no material flakes off. Ordinarily this suggestion would seem totally out of order because of the characteristic of glass to fail in shear and fly under stress in compression. However, the sheathings of my invention prevent this type of failure and true compressive loads may be applied to and maintained on glass masses.

This invention thus takes on the significance of a new art having its own design characteristics and opening up possibilities of new and novel types of commercial articles and artistic expressions. Note is made of the fact that the outstanding point of technique in designing for this art is the advisability of balancing the tension stress in the coating around the center of gravity of every section. This point favors the use of solids of revolution and smooth curving outlines in articles of bulk. In sheetlike articles the problem shifts to the maintaining of contact between the coating and the sheet surfaces. Failure of the contact will be cumulative in its spreading and hence any design which tends to confine failure within limits is to be favored.

In the claim the term "glass" is used generically to include all substances having the frangible nature of glass. The term "plastic" is used generically to include all substances which are comparatively non-fracturable under normal conditions and at ordinary temperatures.

The term "gaseous conduction tubing" embraces illuminating devices of all types comprising elongated tubular bodies charged with fluid, vapor or gas and caused to become luminous by the application of electric energy thereto.

Having thus described my invention, what I claim is:

In a luminous display, a sheet of frangible material, an elongated gaseous conduction lighting tube of frangible material convoluted in the form of a design along a surface of said sheet, and a coating of plastic material covering the surface of said tube as a sheathing and following the convolutions thereof and coating the adjacent surface of said sheet.

HAROLD RAY OWEN.